(12) United States Patent
Miura et al.

(10) Patent No.: US 11,658,312 B2
(45) Date of Patent: May 23, 2023

(54) MANUFACTURING METHOD FOR FUEL CELL

(71) Applicant: TOYOTA JIDOSHA KABUSHIKI KAISHA, Toyota (JP)

(72) Inventors: Atsuhiro Miura, Nisshin (JP); Kenji Sato, Kasugai (JP); Takuya Kurihara, Miyoshi (JP); Takayuki Furuhata, Nagakute (JP); Atsushi Fukunishi, Toyota (JP); Tomohiro Hangai, Miyoshi (JP); Hiroomi Kobayashi, Kazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 17/243,767

(22) Filed: Apr. 29, 2021

(65) Prior Publication Data

US 2021/0376337 A1  Dec. 2, 2021

(30) Foreign Application Priority Data

May 26, 2020 (JP) .............................. JP2020-091635

(51) Int. Cl.
*H01M 8/0232* (2016.01)
*B23K 26/20* (2014.01)
*H01M 8/0258* (2016.01)
*H01M 8/0234* (2016.01)

(52) U.S. Cl.
CPC ........... *H01M 8/0232* (2013.01); *B23K 26/20* (2013.01); *H01M 8/0234* (2013.01); *H01M 8/0258* (2013.01)

(58) Field of Classification Search
CPC ....... H01M 2008/1095; H01M 8/0206; H01M 8/0213; H01M 8/0228; H01M 8/0232; H01M 8/0234; H01M 8/0258; H01M 8/0273; H01M 8/0297; H01M 8/1004;
(Continued)

(56) References Cited

U.S. PATENT DOCUMENTS

2005/0252892 A1* 11/2005 Newman .............. H01M 8/0223
219/121.64
2009/0130537 A1   5/2009 Osada et al.
(Continued)

FOREIGN PATENT DOCUMENTS

| CN | 109890589 A | 6/2019 | |
| JP | 2004335121 A | * 11/2004 | .............. H01M 8/10 |
| JP | 2008135299 A | 6/2008 | |

(Continued)

OTHER PUBLICATIONS

Machine translation JP2004335121A (Year: 2004).*

*Primary Examiner* — Victoria H Lynch
(74) *Attorney, Agent, or Firm* — Dickinson Wright, PLLC

(57) ABSTRACT

A manufacturing method for manufacturing a fuel cell includes a laser application step and a bonding step. In the laser application step, a laser beam is applied to a carbon film of a separator including a metal plate and the carbon film covering a surface of the metal plate such that the metal plate is exposed by removing the carbon film within an application range of the laser beam. In the bonding step, the separator is bonded to a resin member within a range including at least part of a range where the metal plate is exposed.

5 Claims, 16 Drawing Sheets

(58) Field of Classification Search
CPC ...... H01M 8/2483; B23K 26/20; Y02E 60/50; Y02P 70/50
See application file for complete search history.

(56) References Cited

U.S. PATENT DOCUMENTS

| | | | |
|---|---|---|---|
| 2010/0196784 A1* | 8/2010 | Kimura | H01M 8/0228 156/60 |
| 2019/0091905 A1 | 3/2019 | Okashita et al. | |

FOREIGN PATENT DOCUMENTS

| JP | 2017216181 A | 12/2017 |
|---|---|---|
| JP | 2018129213 A | 8/2018 |
| JP | 2020061250 A | 4/2020 |

* cited by examiner

MANUFACTURING METHOD FOR FUEL CELL

CROSS-REFERENCE TO RELATED APPLICATION

This application claims priority to Japanese Patent Application No. 2020-091635 filed on May 26, 2020, incorporated herein by reference in its entirety.

BACKGROUND

1. Technical Field

The technology described in the present specification relates to a manufacturing method for a fuel cell.

2. Description of Related Art

A fuel cell described in Japanese Unexamined Patent Application Publication No. 2018-129213 (JP 2018-129213 A) has a structure in which a resin frame (also referred to as a resin sheet) is fixed by being sandwiched between separators provided as a pair. The separators are bonded to the resin frame. The resin frame has a through-hole, and the separators cover the through-hole. A membrane electrode assembly is placed in the through-hole. Further, a gasket is bonded to a back surface (a surface opposite to a surface bonded to the resin frame) of one of the separators.

SUMMARY

In the fuel cell of JP 2018-129213 A, surfaces of the separators are covered with carbon films. That is, the separators are each constituted by a metal plate and a carbon film covering a surface of the metal plate. On this account, the carbon film is bonded to a resin member such as the resin frame or the gasket. In a case where the resin member is bonded to the carbon film, it is difficult to bond the resin member with high adhesive strength.

Further, the separators can have a structure in which metal plates are exposed to surfaces of the separators (that is, a structure where the surfaces are not covered with carbon films). In the separators of this type, dirt (e.g., lubricant or the like to be used when the metal plates are machined) may be attached to the surfaces of the separators. When a laser beam is applied to the separators, it is possible to remove the dirt on the surfaces of the metal plates and to bond the separators to a resin member after that. However, since the separators (that is, the metal plates) are glossy, the laser beam is easily reflected from the surfaces of the separators, and the laser beam can be hardly absorbed by the separators. On this account, it is difficult to sufficiently remove the dirt on the surfaces of the separators. Accordingly, it is difficult to bond the separators to the resin member with high adhesive strength.

As described above, in the fuel cell in the related art, it is difficult to bond the separators to the resin member with high adhesive strength. On this account, there is such a problem that bonding parts of the separators to the resin member easily peel off due to a pressure (pressures of various types of gas or a pressure of a refrigerant) caused in the fuel cell. The present specification proposes a manufacturing method for manufacturing a fuel cell in which a separator can be bonded to a resin member with high adhesive strength.

A manufacturing method for manufacturing a fuel cell as described in the present specification includes a laser application step and a bonding step. In the laser application step, a laser beam is applied to a carbon film of a separator including a metal plate and the carbon film covering a surface of the metal plate such that the metal plate is exposed by removing the carbon film within an application range of the laser beam. In the bonding step, the separator is bonded to a resin member within a range including at least part of a range where the metal plate is exposed.

Note that the carbon film may be any film, provided that the film includes carbon as an elementary substance.

In the laser application step, the carbon film is removed within the application range of the laser beam. The carbon film easily absorbs the laser beam. Accordingly, in the laser application step, the temperature of the carbon film within the application range easily increases, so that the carbon film can be easily removed. Further, the temperature of the carbon film easily increases, and therefore, in a case where dirt is attached on the surface of the metal plate, the dirt is removed together with the carbon film. On this account, the metal plate can be exposed in a state where the metal plate has less dirt. On this account, in the bonding step, the metal plate within an exposed range can be bonded to the resin member with high adhesive strength. Thus, with the manufacturing method, it is possible to bond a separator to a resin member with high adhesive strength.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
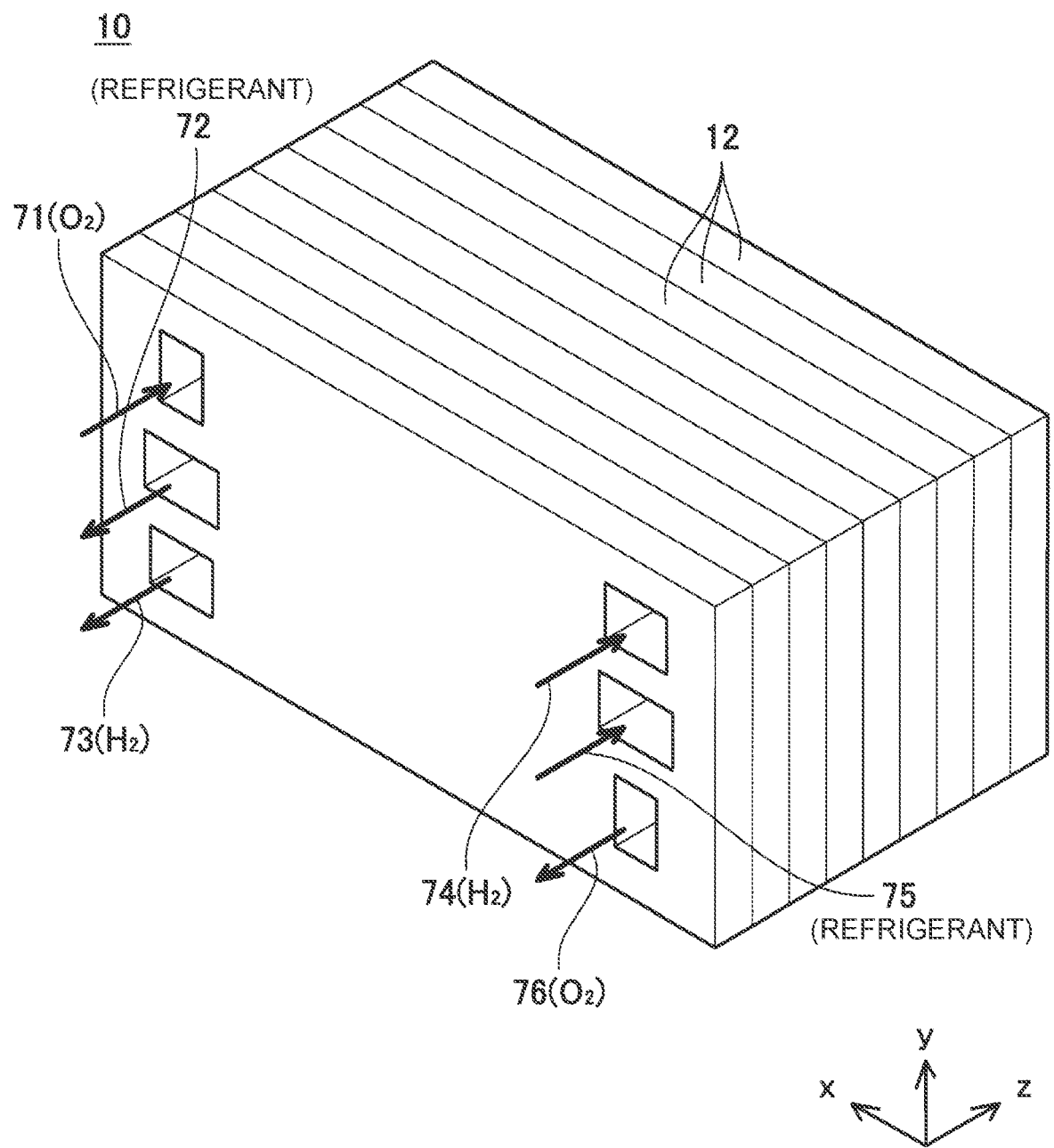
FIG. 1 is a perspective view of a fuel cell stack.

Technical elements described in the present disclosure are listed below. Note that the technical elements to be described below are useful independently from each other.

In the manufacturing method as one example described in the present specification, the resin member may be a resin frame having a through-hole. The manufacturing method may further include a step of placing a membrane electrode assembly in the through-hole. In the bonding step, the separator may be bonded to the resin frame such that the through-hole is closed by the separator. Note that the step of placing the membrane electrode assembly in the through-hole may be executed before the bonding step, may be executed after the bonding step, or may be executed at the same time as the bonding step.

With this configuration, it is possible to bond the separator to the resin frame with high adhesive strength.

In the manufacturing method as one example described in the present specification, when the separator is bonded to the resin frame, a gas passage may be formed on an interface between the separator and the resin frame. The laser application step and the bonding step may be executed to satisfy the following conditions: a condition in which the application range of the laser beam is placed to be distanced from the gas passage and to extend along the gas passage; a condition in which a bonding range in which the separator is bonded to the resin frame is placed to be distanced from the gas passage and to extend along the gas passage; and a condition in which the central axis of the application range is placed at a position closer to the gas passage than the central axis of the bonding range.

With this configuration, even when the width of the application range of the laser beam is narrowed, it is possible to give high bonding strength to a bonding part. Further, by narrowing the width of the application range of the laser beam, the laser application step can be executed in a short time.

In the manufacturing method as one example described in the present specification, when the separator is bonded to the resin frame, a gas passage may be formed on an interface between the separator and the resin frame. In the bonding step, the separator may be bonded to the resin frame within a pressurization range by heating the pressurization range while the separator is pressurized to the resin frame by a metal die. The laser application step and the bonding step may be executed to satisfy the following conditions: a condition in which the application range of the laser beam is placed to be distanced from the gas passage and to extend along the gas passage; a condition in which the pressurization range is placed to be distanced from the gas passage and to extend along the gas passage; and a condition in which the central axis of the application range is placed at a position closer to the gas passage than the central axis of the pressurization range.

With this configuration, even when the width of the application range of the laser beam is narrowed, it is possible to give high bonding strength to the bonding part. Further, by narrowing the width of the application range of the laser beam, the laser application step can be executed in a short time.

In the manufacturing method as one example described in the present specification, the resin member may be a gasket. The separator may include a first surface covered with the carbon film and a second surface placed on a side opposite to the first surface. In the laser application step, the laser beam may be applied to the first surface. In the bonding step, the first surface may be bonded to the gasket. The manufacturing method may further include: a step of placing a membrane electrode assembly in a through-hole of a resin frame having the through-hole; and a step of bonding the second surface to the resin frame such that the through-hole is closed by the separator.

Note that the step of placing the membrane electrode assembly in the through-hole and the step of bonding the second surface to the resin frame may be executed before the laser application step, may be executed after the laser application step, or may be executed after the bonding step.

With this configuration, it is possible to bond the separator to the gasket with high adhesive strength.

In the manufacturing method as one example described in the present specification, a laser fluence in the laser application step may be 100 mJ/mm$^2$ or less. In the bonding step, the separator may be bonded to the resin member after an adhesive hardener or an adhesive promoter is applied to the surface of the metal plate within the application range.

When the laser fluence in the laser application step is set to 100 mJ/mm$^2$ or less, it is possible to form a porous structure on the surface (that is, the exposed surface) of the metal plate within the application range. On this account, when the adhesive hardener or the adhesive promoter is applied to the surface of the metal plate within the application range, the adhesive hardener or the adhesive promoter can permeate the porous structure. Accordingly, it is possible to restrain the adhesive hardener or the adhesive promoter from moving from the surface of the metal plate in the bonding step, thereby making it possible to bond the metal plate to the resin member more appropriately.

A fuel cell stack 10 illustrated in FIG. 1 is constituted by a laminated body including a plurality of fuel cells 12. In the drawings including FIG. 1, a direction where the fuel cells 12 are laminated is indicated by a z-direction, one direction perpendicular to the z-direction is indicated by an x-direction, and a direction perpendicular to the x-direction and the z-direction is indicated by ay-direction. Passages 71 to 76 are provided in the fuel cell stack 10. The passages 71 to 76 extend in the z-direction from an end surface of the fuel cell stack 10. The passage 71 is an oxidant gas supply passage, and the passage 76 is an oxidant gas discharge passage. Oxidant gas (oxygen ($O_2$) in the present embodiment) is supplied to the fuel cells 12 through the oxidant gas supply passage 71. The oxidant gas that has passed through the fuel cells 12 is discharged to outside the fuel cell stack 10 through the oxidant gas discharge passage 76. The passage 74 is a fuel gas supply passage, and the passage 73 is a fuel gas discharge passage. Fuel gas (hydrogen ($H_2$) in the present embodiment) is supplied to the fuel cells 12 through the fuel gas supply passage 74. The fuel gas that has passed through the fuel cells 12 is discharged to outside the fuel cell stack 10 through the fuel gas discharge passage 73. When the fuel gas and the oxidant gas are supplied to the fuel cells, power generation is performed in the fuel cells 12. The passage 75 is a refrigerant supply passage, and the passage 72 is a refrigerant discharge passage. Refrigerant is supplied to the fuel cells 12 through the refrigerant supply passage 75. The refrigerant that has passed through the fuel cells 12 is discharged to outside the fuel cell stack 10 through the refrigerant discharge passage 72. The fuel cells 12 are cooled by the refrigerant flowing through the fuel cell stack 10.

Figure 2:
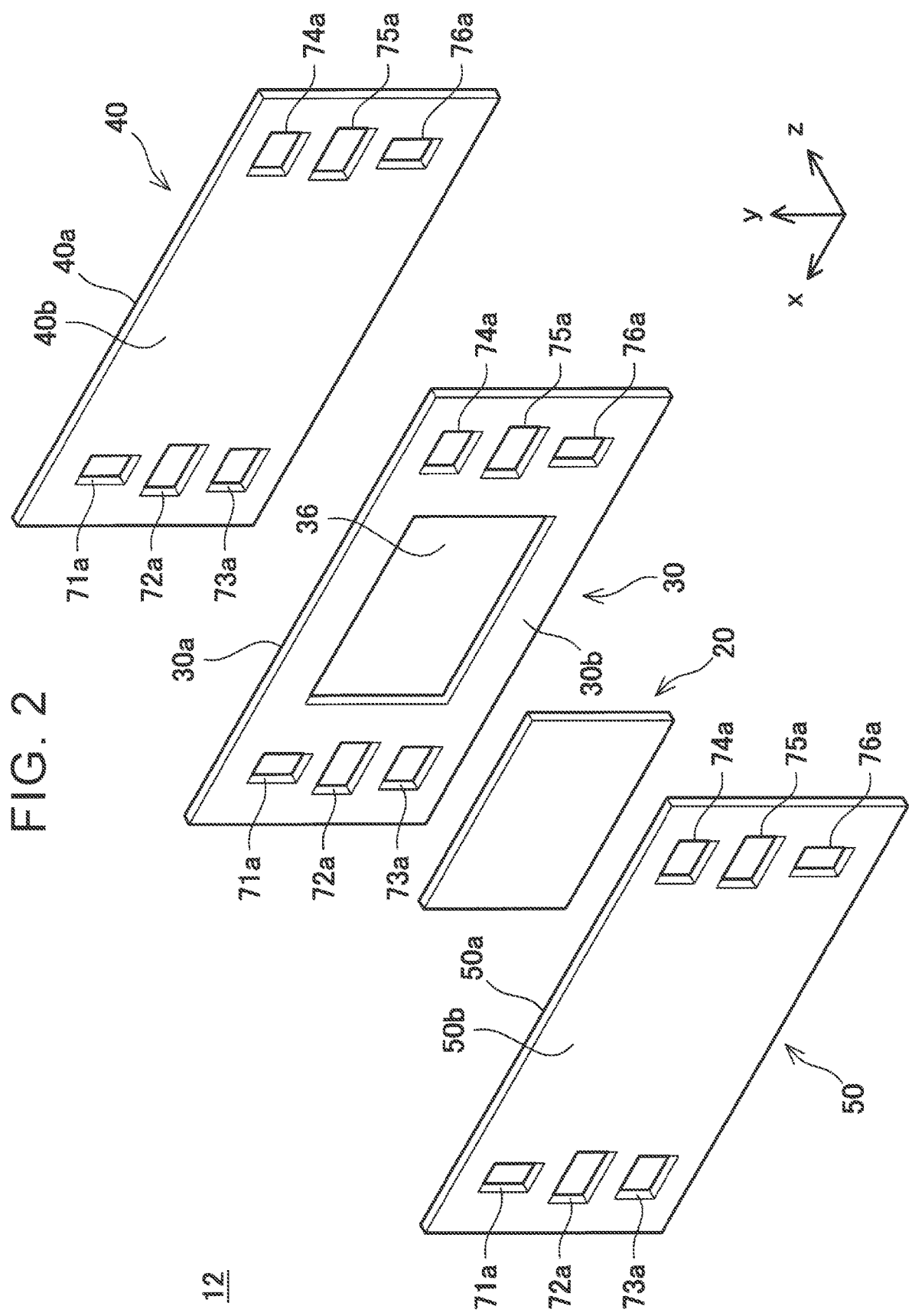
FIG. 2 is an exploded perspective view of a fuel cell.

FIG. 2 is an exploded perspective view of one fuel cell 12. As illustrated in FIG. 2, the fuel cell 12 includes a membrane electrode assembly (hereinafter referred to as MEA) 20, a resin frame 30, a separator 40, and a separator 50. The resin frame 30, the separator 40, and the separator 50 have a plate shape and are laminated in the z-direction. In the following description, a surface, of the resin frame 30, that is close to the separator 40 is referred to as a surface 30a, and a surface, of the resin frame 30, that is opposite to the surface 30a is referred to as a surface 30b. Further, in the following description, a surface, of the separator 40, that is close to the resin frame 30 is referred to as a surface 40b, and a surface, of the separator 40, that is opposite to the surface 40b is referred to as a surface 40a. Further, in the following description, a surface, of the separator 50, that is close to the resin frame 30 is referred to as a surface 50a, and a surface, of the separator 50, that is opposite to the surface 50a is referred to as a surface 50b. A through-hole 36 penetrating through the resin frame 30 in the z-direction is provided in the center of the resin frame 30. The MEA 20 is placed in the through-hole 36. The surface 40b of the separator 40 is bonded to the surface 30a of the resin frame 30. The through-hole 36 is covered with the separator 40. The surface 50a of the separator 50 is bonded to the surface 30b of the resin frame 30. The through-hole 36 is covered with the separator 50. Thus, the resin frame 30 is sandwiched between the separator 40 and the separator 50.

The resin frame 30, the separator 40, and the separator 50 each have a through-hole 71a corresponding to the passage 71, a through-hole 72a corresponding to the passage 72, a through-hole 73a corresponding to the passage 73, a through-hole 74a corresponding to the passage 74, a through-hole 75a corresponding to the passage 75, and a through-hole 76a corresponding to the passage 76. When the fuel cell 12 is viewed in a plan view along the z-direction, the through-hole 36 (that is, the MEA 20) is placed between the through-holes 71a, 72a, 73a and the through-holes 74a, 75a, 76a.

Figure 3:
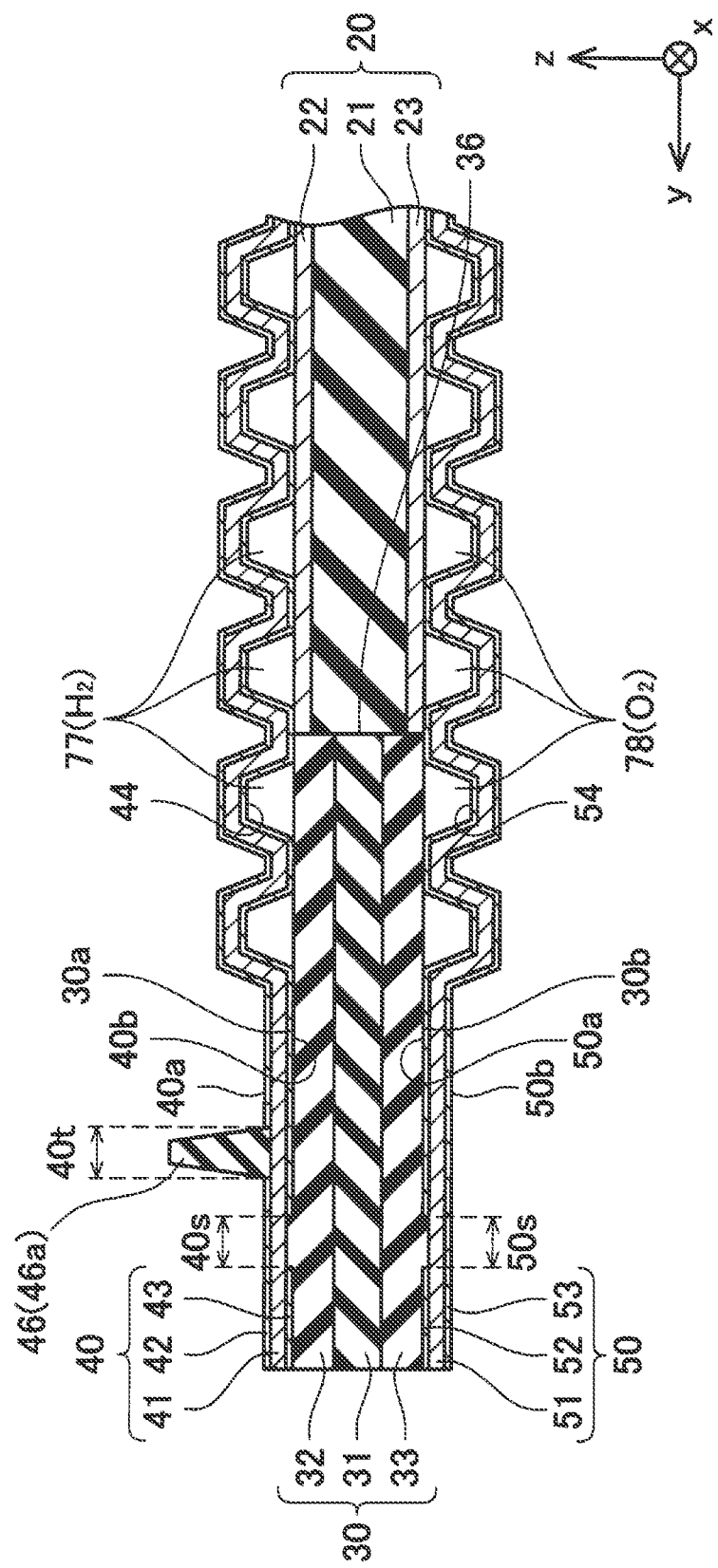
FIG. 3 is a sectional view of the fuel cell (a sectional view taken along a line in FIGS. 4 to 6)

The resin frame 30 is an insulating member. As illustrated in FIG. 3, the resin frame 30 includes resin layers 31, 32, 33 laminated in the z-direction. The resin layers 31, 32, 33 are all made of insulating resin (e.g., acid-modified polypropylene or the like). The resin layer 31 has high rigidity. The resin layers 32, 33 have thermoplasticity and exhibit high adhesiveness when the resin layers 32, 33 soften. The resin layer 31 is sandwiched between the resin layer 32 and the resin layer 33. As will be described later in detail, the resin layer 32 is bonded to the separator 40, and the resin layer 33 is bonded to the separator 50.

The MEA 20 includes an electrolyte membrane 21, an anode layer 22, and a cathode layer 23. The electrolyte membrane 21 is made of a solid polymer material. The anode layer 22 and the cathode layer 23 are made of a material in which conductive particles including catalyst such as platinum are dispersed in electrolyte, or the like. The anode layer 22 covers a surface of the electrolyte membrane 21 on a side closer to the separator 40. The cathode layer 23 covers a surface of the electrolyte membrane 21 on a side closer to the separator 50.

The separator 40 is an electrically-conductive member. The separator 40 includes a metal plate 41 and carbon films 42, 43. The metal plate 41 is made of titanium (Ti) or titanium alloy. The carbon film 43 covers a surface of the metal plate 41 on a side closer to the resin frame 30 and the MEA 20. The carbon film 42 covers a surface of the metal plate 41 on a side opposite to the carbon film 43.

Figure 4:
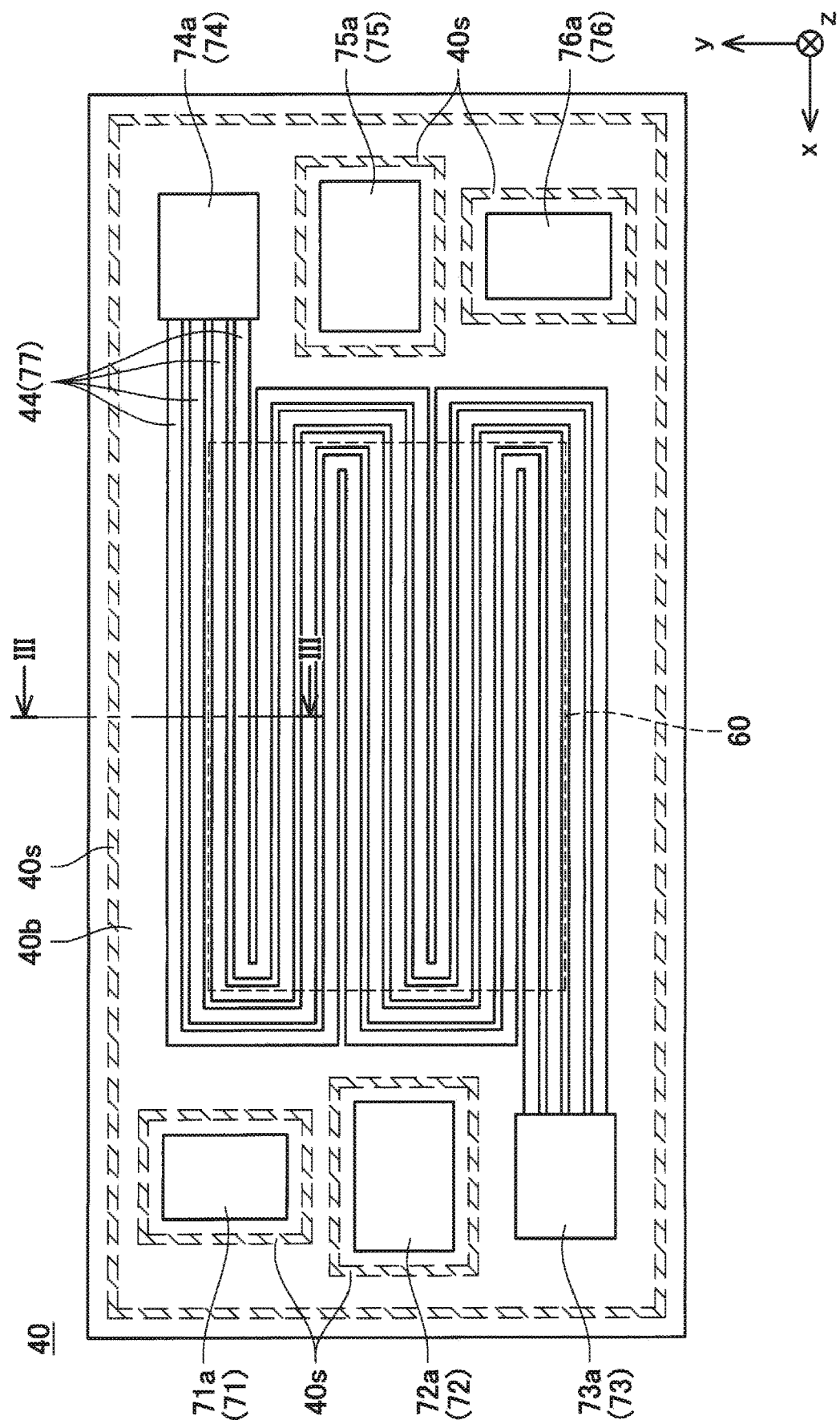
FIG. 4 is a plan view of a surface 40b of a separator 40.

The separator 40 partially bends, so that the surface 40b of the separator 40 has grooves 44. As illustrated in FIG. 4, the grooves 44 extend from the through-hole 74a to the through-hole 73a. A range 60 in FIG. 4 indicates a range where the separator 40 faces the MEA 20 (a range where the separator 40 and the MEA 20 overlap each other when they are viewed along the z-direction). The grooves 44 extend in a meandering manner within the range 60. As illustrated in FIG. 3, parts of the surface 40b of the separator 40 other than the grooves 44 make contact with the resin frame 30 and the MEA 20. More specifically, parts of the surface 40b other than the grooves 44 make contact with the resin layer 32 of the resin frame 30 and the anode layer 22 of the MEA 20. Fuel gas passages 77 are each constituted by a space surrounded by each groove 44, the resin frame 30, and the MEA 20. The fuel gas passages 77 extend along an interface between the separator 40 and the resin frame 30 and an interface between the separator 40 and the MEA 20. The fuel gas flowing through the fuel gas supply passage 74 (the through-hole 74a) flows into the fuel gas passages 77. After the fuel gas flows through the fuel gas passages 77 from their upstream ends to their downstream ends, the fuel gas is discharged to the fuel gas discharge passage 73 (the through-hole 73a).

As illustrated in FIG. 3, the carbon film 43 is not provided in a range 40s that is a part of the surface 40b. The separator 40 is bonded to the resin layer 32 of the resin frame 30 within the range 40s. That is, the metal plate 41 within the range 40s is bonded to the resin layer 32 of the resin frame 30. As illustrated in FIG. 4, the range 40s where the carbon film 43 is not provided is provided on the surface 40b along an outer peripheral edge of the separator 40. Further, respective ranges 40s are provided on the surface 40b so as to surround the through-holes 71a, 72a, 75a, 76a. In the ranges 40s illustrated in FIG. 4, the separator 40 is bonded to the resin frame 30.

The separator 50 is an electrically-conductive member. As illustrated in FIG. 3, the separator 50 includes a metal plate 51 and carbon films 52, 53. The metal plate 51 is made of titanium (Ti) or titanium alloy. The carbon film 52 covers a surface of the metal plate 51 on a side closer to the resin frame 30 and the MEA 20. The carbon film 53 covers a surface of the metal plate 51 on a side opposite to the carbon film 52.

Figure 5:
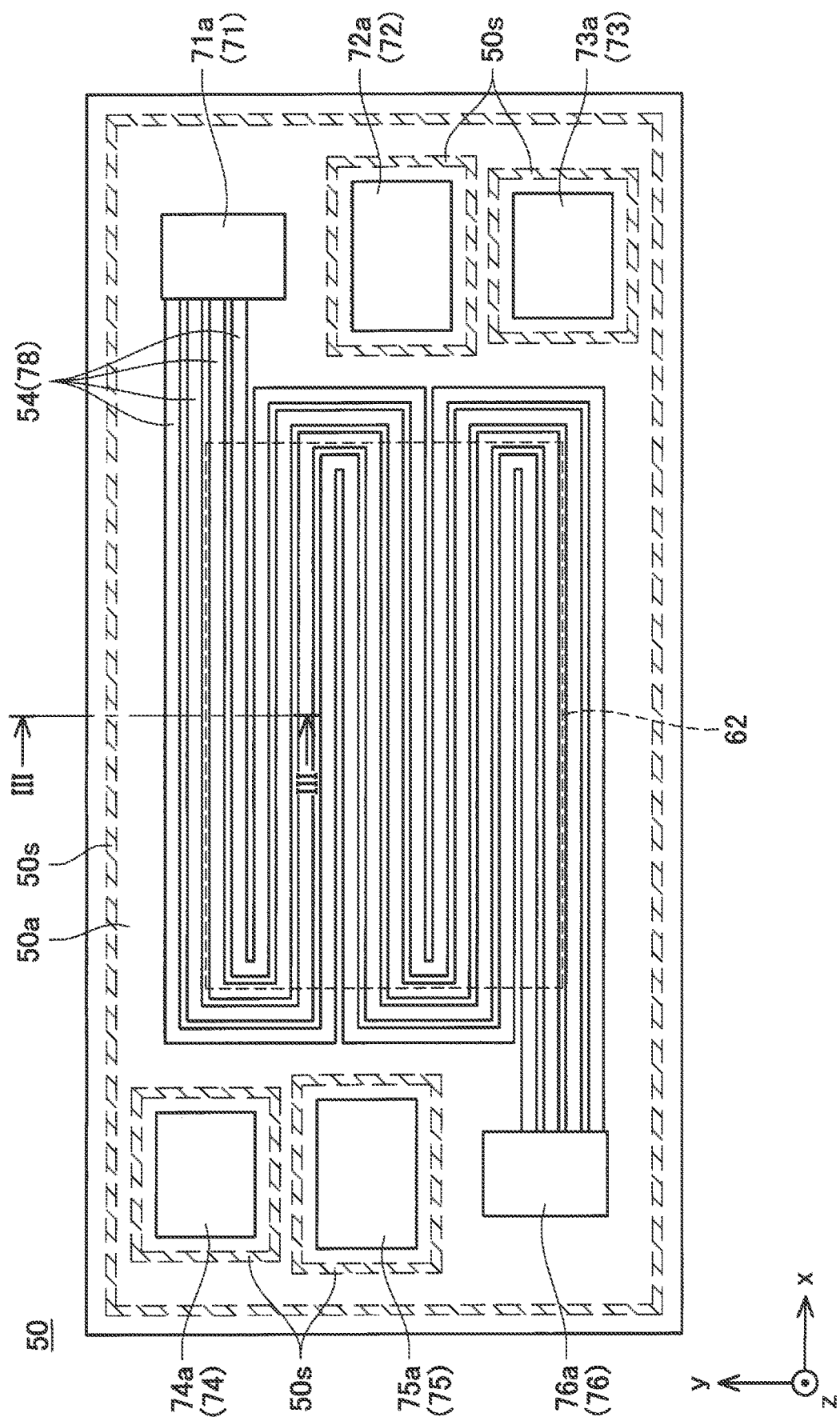
FIG. 5 is a plan view of a surface 50a of a separator 50.

As illustrated in FIG. 3, the separator 50 partially bends, so that the surface 50a of the separator 50 has grooves 54. As illustrated in FIG. 5, the grooves 54 extend from the through-hole 71a to the through-hole 76a. A range 62 in FIG. 5 indicates a range where the separator 50 faces the MEA 20 (a range where the separator 50 and the MEA 20 overlap each other when they are viewed along the z-direction). The grooves 54 extend in a meandering manner within the range 62. As illustrated in FIG. 3, parts of the surface 50a of the separator 50 other than the grooves 54 make contact with the resin frame 30 and the MEA 20. More specifically, parts of the surface 50a other than the grooves 54 make contact with the resin layer 33 of the resin frame 30 and the cathode layer 23 of the MEA 20. Oxidant gas passages 78 are each constituted by a space surrounded by each groove 54, the resin frame 30, and the MEA 20. The oxidant gas passages 78 extend along an interface between the separator 50 and the resin frame 30 and an interface between the separator 50 and the MEA 20. The oxidant gas flowing through the oxidant gas supply passage 71 (the through-hole 71a) flows into the oxidant gas passages 78. After the oxidant gas flows through the oxidant gas passages 78 from their upstream ends to their downstream ends, the oxidant gas is discharged to the oxidant gas discharge passage 76 (the through-hole 76a).

As illustrated in FIG. 3, the carbon film 52 is not provided in a range 50s that is a part of the surface 50a. The separator 50 is bonded to the resin layer 33 of the resin frame 30 within the range 50s. That is, the metal plate 51 in the range 50s is bonded to the resin layer 33 of the resin frame 30. As illustrated in FIG. 5, the range 50s where the carbon film 52 is not provided is provided on the surface 50a along an outer peripheral edge of the separator 50. Further, respective ranges 50s are provided on the surface 50a so as to surround the through-holes 72a, 73a, 74a, 75a. In the ranges 50s illustrated in FIG. 5, the separator 50 is bonded to the resin frame 30.

Figure 6:
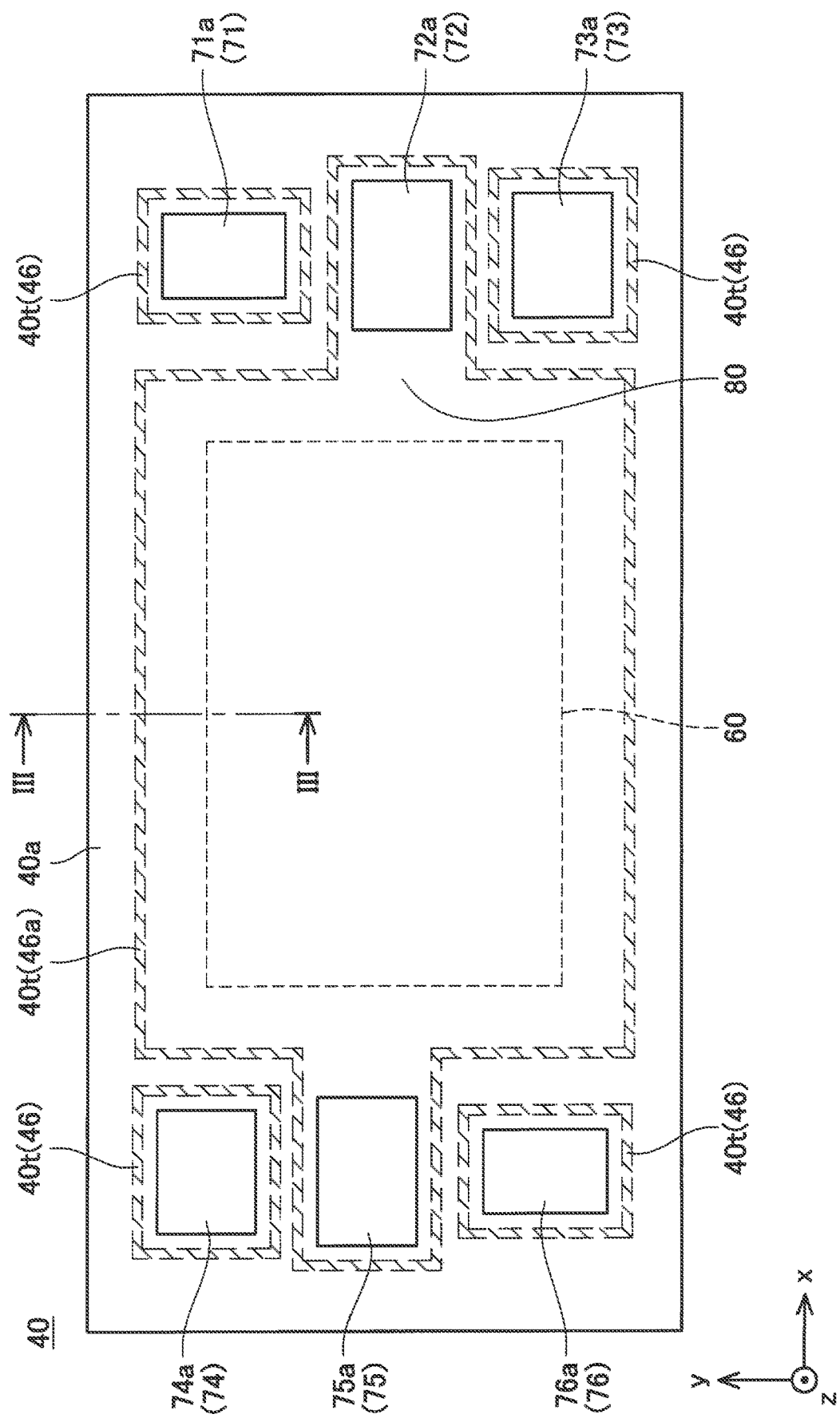
FIG. 6 is a plan view of a surface 40a of the separator 40.
Figure 7:
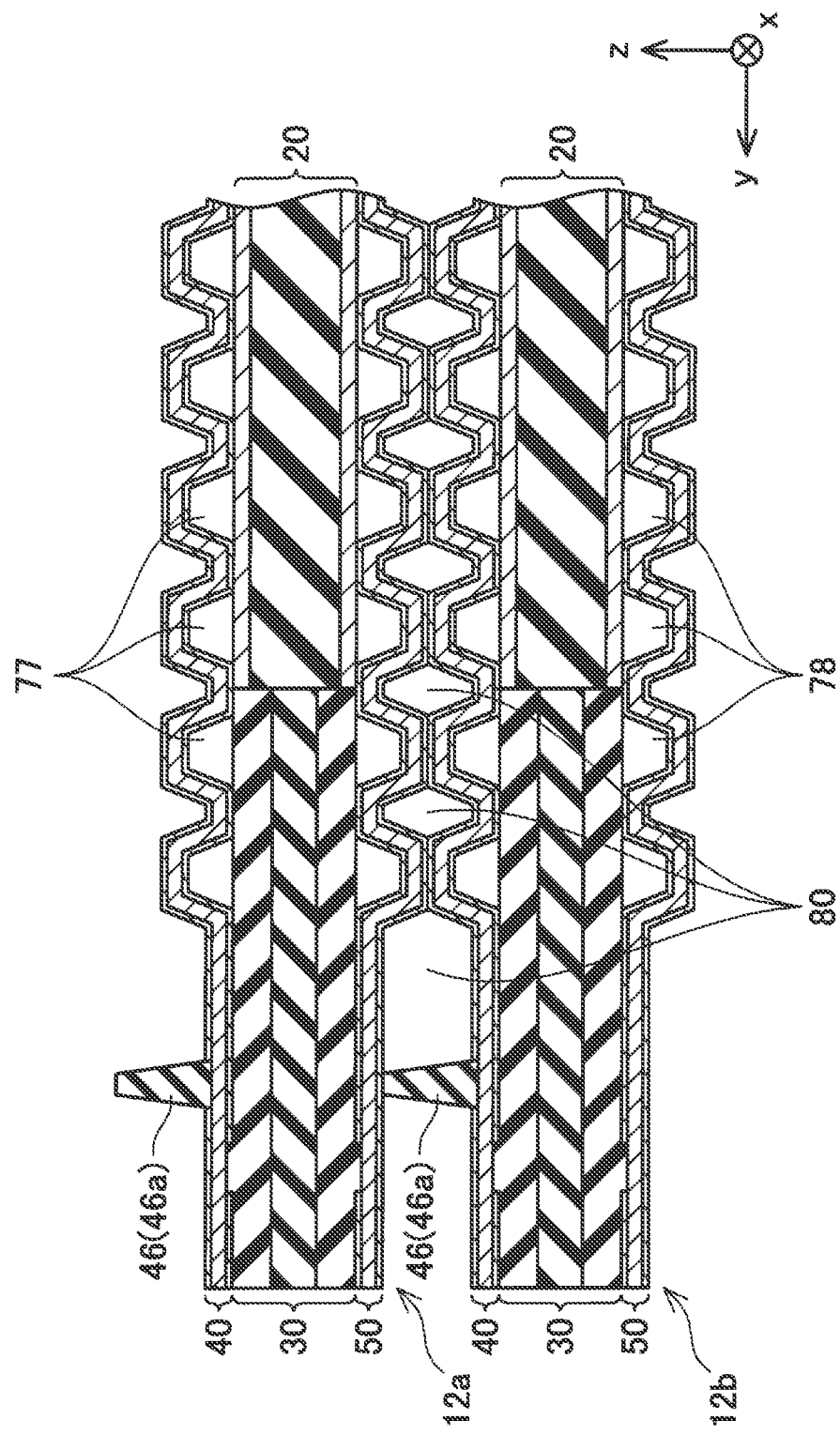
FIG. 7 is a sectional view of laminated fuel cells.

As illustrated in FIG. 3, the carbon film 42 is not provided in a range 40t that is a part of the surface 40a of the separator 40. A gasket 46 is bonded to the separator 40 (that is, the metal plate 41) within the range 40t. As illustrated in FIG. 6, respective ranges 40t where the carbon film 42 is not provided are provided on the surface 40a so as to surround the through-holes 71a, 73a, 74a, 76a. Further, the respective ranges 40t are provided to surround a range including the through-holes 72a, 75a and the range 60 (a range overlapping with the MEA 20) on the surface 40a. Respective gaskets 46 are provided along the respective ranges 40t. In the following description, among the gaskets 46, a part provided to surround a range including the through-holes 72a, 75a and the range 60 is referred to as a gasket 46a. FIG. 7 illustrates a state where a plurality of fuel cells 12a, 12b is laminated in the z-direction. When the fuel cells 12a, 12b are laminated, the gaskets 46 of the fuel cell 12b make contact with the separator 50 of the fuel cell 12a. Hereby, a refrigerant passage 80 surrounded by the gasket 46a, the separator 40, and the separator 50 is formed. As illustrated in FIG. 6, the refrigerant passage 80 is connected to the refrigerant supply passage 75 and the refrigerant discharge passage 72. Refrigerant flows into the refrigerant passage 80 from the refrigerant supply passage 75. The refrigerant that has flowed through the refrigerant passage 80 from its upstream end to its downstream end is discharged to the refrigerant discharge passage 72.

When the fuel cell 12 is activated, the fuel gas is introduced into the fuel gas passage 77, and the oxidant gas is introduced into the oxidant gas passage 78. Hereby, the fuel gas and the oxidant gas are supplied to the MEA 20, so that power generation is performed by the MEA 20. Electric power generated by the MEA 20 is taken out to outside by the separator 40 and the separator 50. That is, the separator 40 and the separator 50 function as wiring lines. Since the surfaces of the separators 40, 50 are covered with the carbon films, the separators 40, 50 have a high conductivity. Accordingly, the electric power is supplied from the MEA 20 to the outside with low loss. Further, when the fuel cell 12 is activated, the refrigerant is introduced into the refrigerant passage 80. Hereby, the MEA 20 is cooled.

Figure 8:
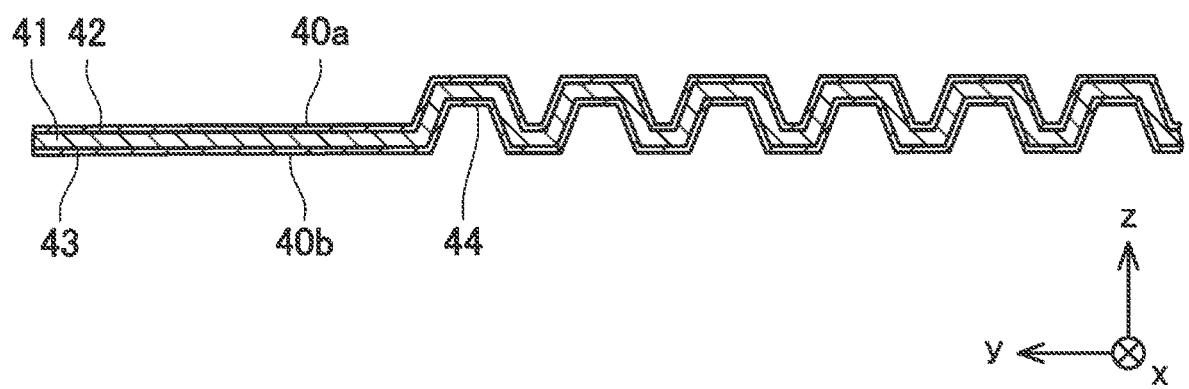
FIG. 8 is an explanatory view of a step of forming a carbon film.

Next will be described a manufacturing method for manufacturing the fuel cell 12 in Embodiment 1. First, the through-holes 71a to 76a and the grooves 44 are formed in the metal plate 41 by press working or the like. Similarly, the through-holes 71a to 76a and the grooves 54 are formed in the metal plate 51 by press working or the like. Then, as illustrated in FIG. 8, the carbon films 42, 43 are formed to cover the whole surface of the metal plate 41. Similarly, the carbon films 52, 53 are formed to cover the whole surface of the metal plate 51. Herein, the carbon films 42, 43, 52, 53 are formed with a thickness of 10 nm to 100 nm.

Laser Application Step

Figure 9:
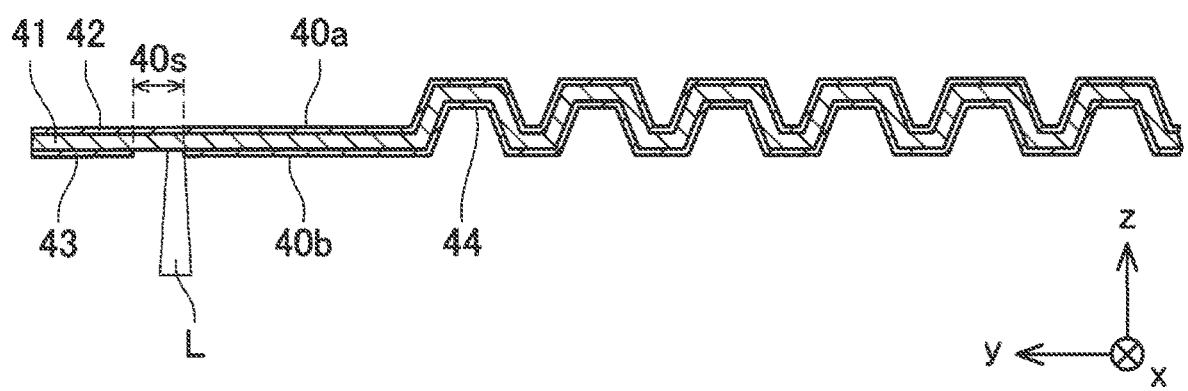
FIG. 9 is an explanatory view of a laser application step.

Then, as illustrated in FIG. 9, a laser beam L (for example, a YAG laser beam) is applied to part of the surface 40b of the separator 40 so as to remove the carbon film 43 within an application range of the laser beam. Hereby, the ranges 40s in which the carbon film 43 is removed are formed. Herein, the ranges 40s are formed by moving a laser spot. As illustrated in FIG. 4, the ranges 40s are formed at positions distanced from the grooves 44 (that is, the passages 77). In a given range (e.g., a range where a line is placed) on the surface 40b, the range 40s is formed to extend along the grooves 44 (that is, the passages 77). Note that the width of the application range of the laser beam (that is, the width of the range 40s) can be set to 1 mm to 10 mm. Since the carbon film 43 easily absorbs the laser beam, the separator 40 is heated to a high temperature within the application range of the laser beam. Hereby, the carbon film 43 evaporates to be removed. Further, in a case where dirt (e.g., a residual substance of lubricant) is attached on the surface of the metal plate 41, the dirt evaporates together with the carbon film 43. Accordingly, the metal plate 41 is exposed in a state where almost no dirt remains within the ranges 40s. Similarly, a laser beam is applied to part of the surface 40a of the separator 40 so as to remove the carbon film 42 within an application range of the laser beam, so that the ranges 40t in which the carbon film 42 is removed are formed as illustrated in FIGS. 3, 6. Similarly, a laser beam is applied to part of the surface 50a of the separator 50 so as to remove the carbon film 52 within an application range of the laser beam, so that the ranges 50s in which the carbon film is removed are formed as illustrated in FIGS. 3, 5. As illustrated in FIG. 5, the ranges 50s are formed at positions distanced from the grooves 54 (that is, the passages 78). In a given range (e.g., a range where a line is placed) on the surface 50a, the range 50s is formed to extend along the grooves 54 (that is, the passages 78).

Separator Bonding Step

Figure 10:
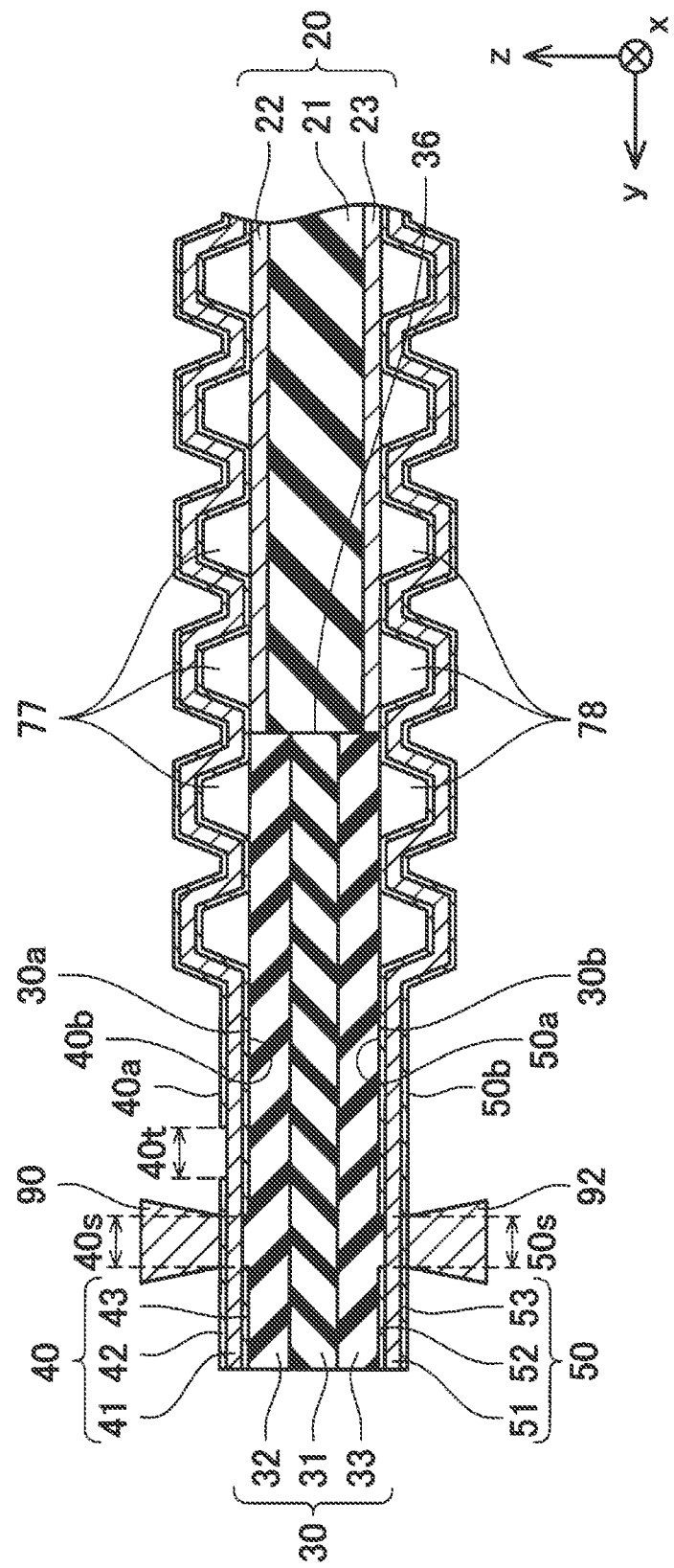
FIG. 10 is an explanatory view of a resin frame bonding step.
Figure 11:
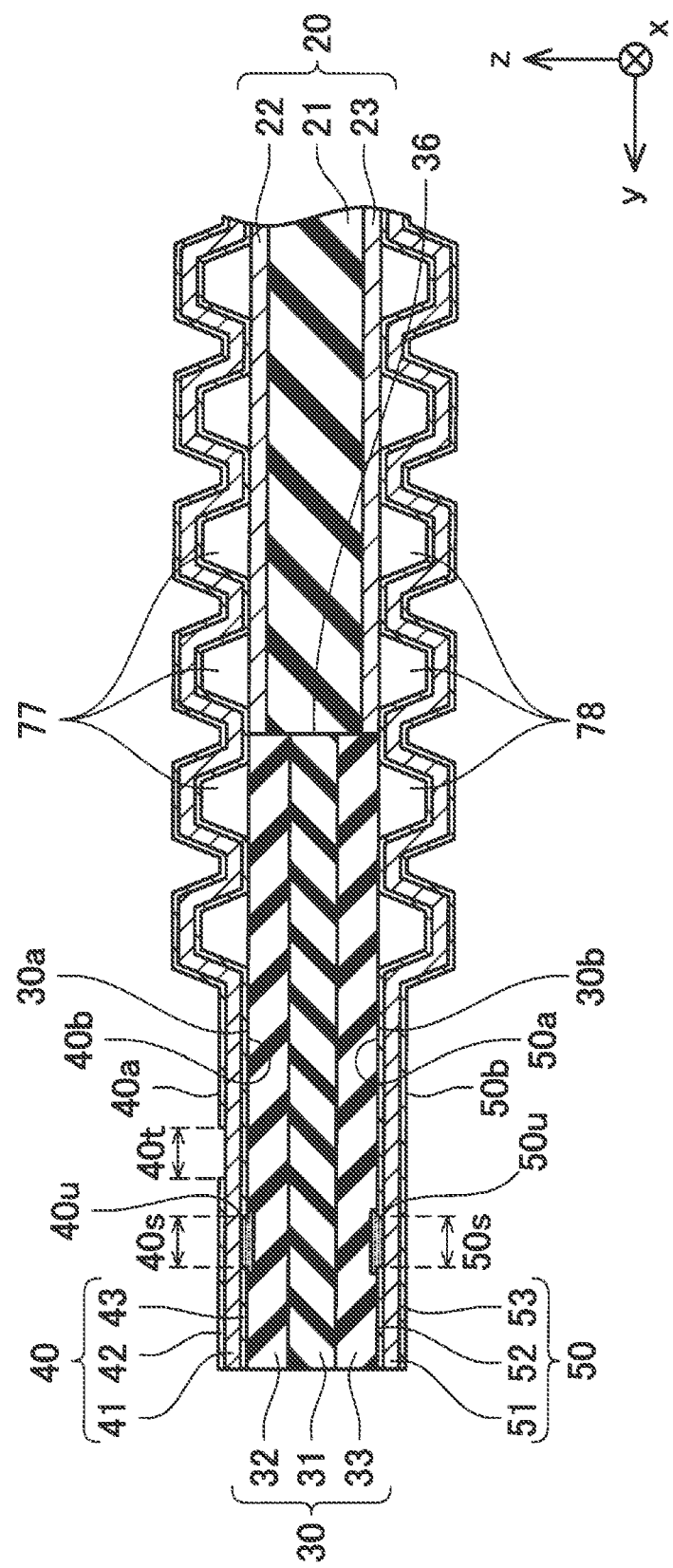
FIG. 11 is an explanatory view of the resin frame bonding step.

Subsequently, as illustrated in FIG. 10, the resin frame 30 is sandwiched between the separator 40 and the separator 50 in a state where the MEA 20 is placed in the through-hole 36 of the resin frame 30. Herein, the surface 40b of the separator 40 is brought into contact with the resin frame 30 and the MEA 20, and the surface 50a of the separator 50 is brought into contact with the resin frame 30 and the MEA 20. In a state where the through-hole 36 of the resin frame 30 is closed by the separators 40, 50 as such, the separators 40, 50 are bonded to the resin frame 30. That is, first, as illustrated in FIG. 10, a part of a laminated body including the separator 40, the resin frame 30, and the separator 50 is sandwiched between metal dies 90, 92. Herein, a part, of the laminated body, that includes the ranges 40s, 50s is sandwiched by the metal dies 90, 92. Then, while the laminated body is pressurized by the metal dies 90, 92, a part thus pressurized (that is, the part including the ranges 40s, 50s) is heated to 150° C. to 180° C. via the metal dies 90, 92. Hereby, the resin layers 32, 33 soften in the vicinity of the metal dies 90, 92. After that, the laminated body is cooled, so that the resin layers 32, 33 thus softening harden. Hereby, as illustrated in FIG. 11, the resin layer 32 is bonded to the separator 40 within a bonding range 40u, and the resin layer 33 is bonded to the separator 50 within a bonding range 50u. The bonding ranges 40u, 50u are pressurization ranges pressurized by the metal dies 90, 92. The bonding range 40u is formed at a position distanced from the passages 77. The bonding range 40u is formed along the range 40s. Accordingly, similarly to the range 40s illustrated in FIG. 4, in a given range (e.g., a range where the line is placed) on the surface 40b, the bonding range 40u is formed to extend along the passages 77. As illustrated in FIG. 11, the bonding range 50u is formed at a position distanced from the passages 78. The bonding range 50u is formed along the range 50s. Accordingly, similarly to the range 50s illustrated in FIG. 5, in a given range (e.g., a range where the line is placed) on the surface 50a, the bonding range 50u is formed to extend along the passages 78. Herein, as illustrated in FIG. 11, the resin layer 32 is bonded to the separator 40 within the bonding range 40u wider than the range 40s. On this account, the resin layer 32 is bonded to the metal plate 41 over the whole region within the range 40s. Since dirt is removed from the surface of the metal plate 41 within the range 40s by application of the laser beam, the resin layer 32 is bonded to the metal plate 41 with high adhesive strength. Further, the resin layer 33 is bonded to the separator 50 within the bonding range 50u wider than the range 50s. On this account, the resin layer 33 is bonded to the metal plate 51 over the whole region within the range 50s. Since dirt is removed from the surface of the metal plate 51 within the range 50s by application of the laser beam, the resin layer 33 is bonded to the metal plate 51 with high adhesive strength.

Gasket Bonding Step

Subsequently, as illustrated in FIG. 3, the gasket 46 is bonded to the range 40t on the surface 40a of the separator 40. The gasket 46 may be bonded by adhesive, or the gasket 46 may be bonded to the separator 40 when the gasket 46 hardens. Since dirt is removed from the surface of the metal plate 41 within the range 40t by application of the laser beam, the gasket 46 is bonded to the metal plate 41 with high adhesive strength. The fuel cell 12 illustrated in FIG. 3 is completed by bonding the gasket 46.

Figure 12:
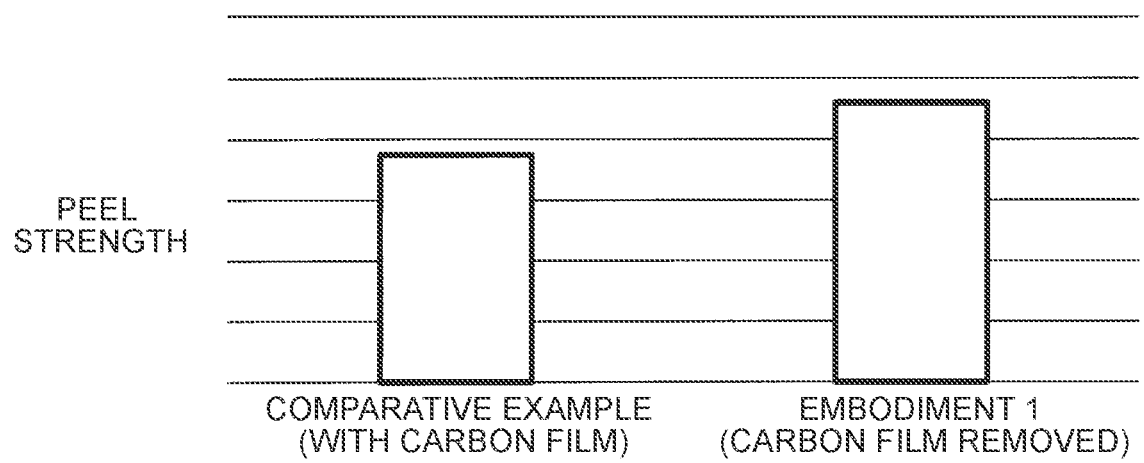
FIG. 12 is a graph illustrating a difference in peel strength based on whether a carbon film is provided or not.

As described above, with the manufacturing method of Embodiment 1, the separators 40, 50 can be bonded to the resin frame 30 with high adhesive strength, and the gasket 46 can be bonded to the separator 40 with high adhesive strength. Note that FIG. 12 illustrates peel strength of a bonding part in the method of Embodiment 1 and peel strength of a bonding part in a method of a comparative example. In the bonding part in the method of Embodiment 1, the separator 40 is bonded to the resin frame 30 in the range 40s where the carbon film 43 is removed. In the bonding part in the comparative example, the separator 40 is bonded to the resin frame 30 without removing the carbon film 43 (that is, the carbon film 43 is bonded to the resin frame 30). As apparent from FIG. 12, with the manufacturing method of Embodiment 1, it is possible to achieve high peel strength.

Note that, in Embodiment 1, the resin member is bonded to the metal plate in a generally whole region of a range where the carbon film is removed. However, bonding may be performed in any manner, provided that the bonding part includes at least part of the range where the carbon film is removed. For example, bonding may be performed only in part of the range where the carbon film is removed.

Next will be described a manufacturing method of Embodiment 2. The manufacturing method of Embodiment 2 is different from Embodiment 1 in that the ranges 40s, 50s where the carbon films 43, 52 are removed are offset from the bonding ranges 40u, 50u. Other configurations of Embodiment 2 are the same as those in Embodiment 1.

Figure 13:
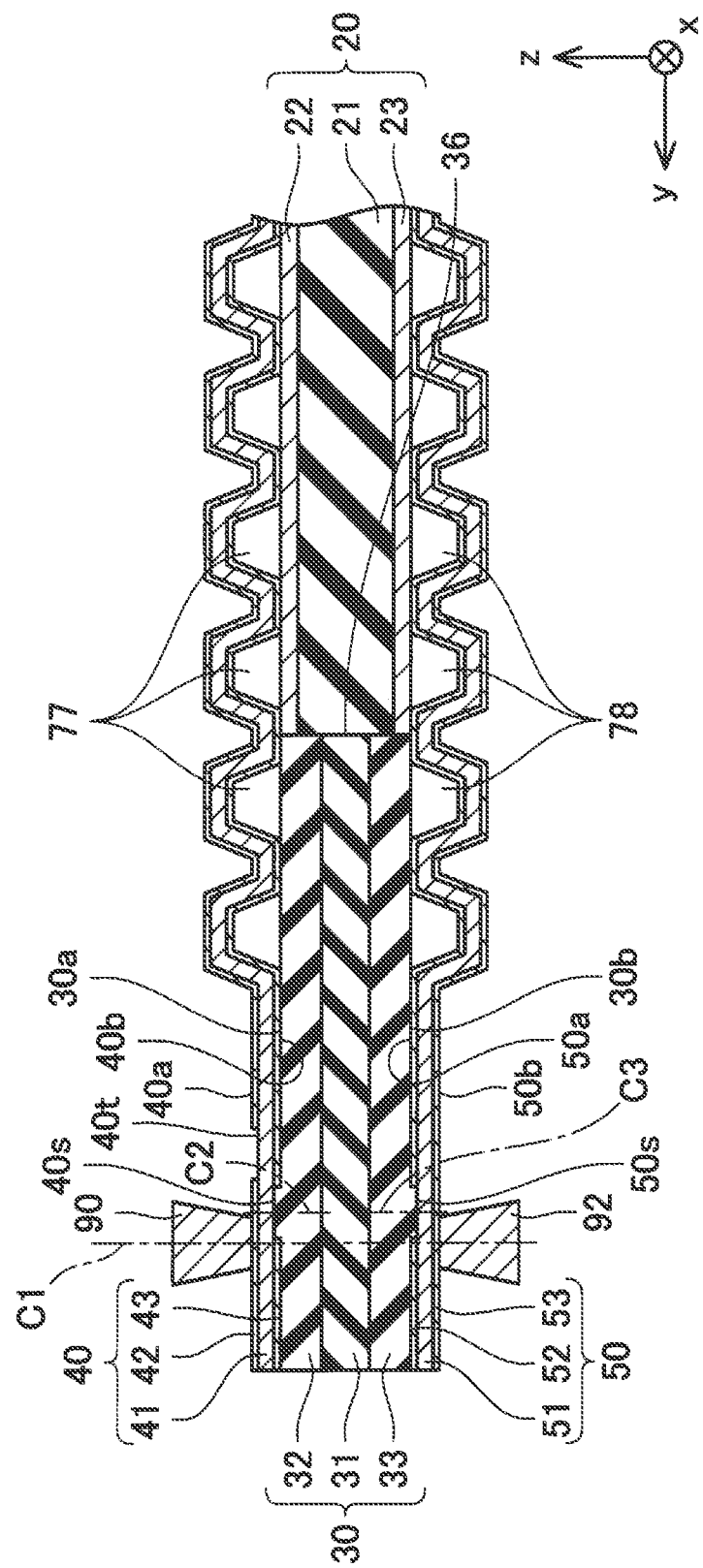
FIG. 13 is an explanatory view of a resin frame bonding step in Embodiment 2.
Figure 14:
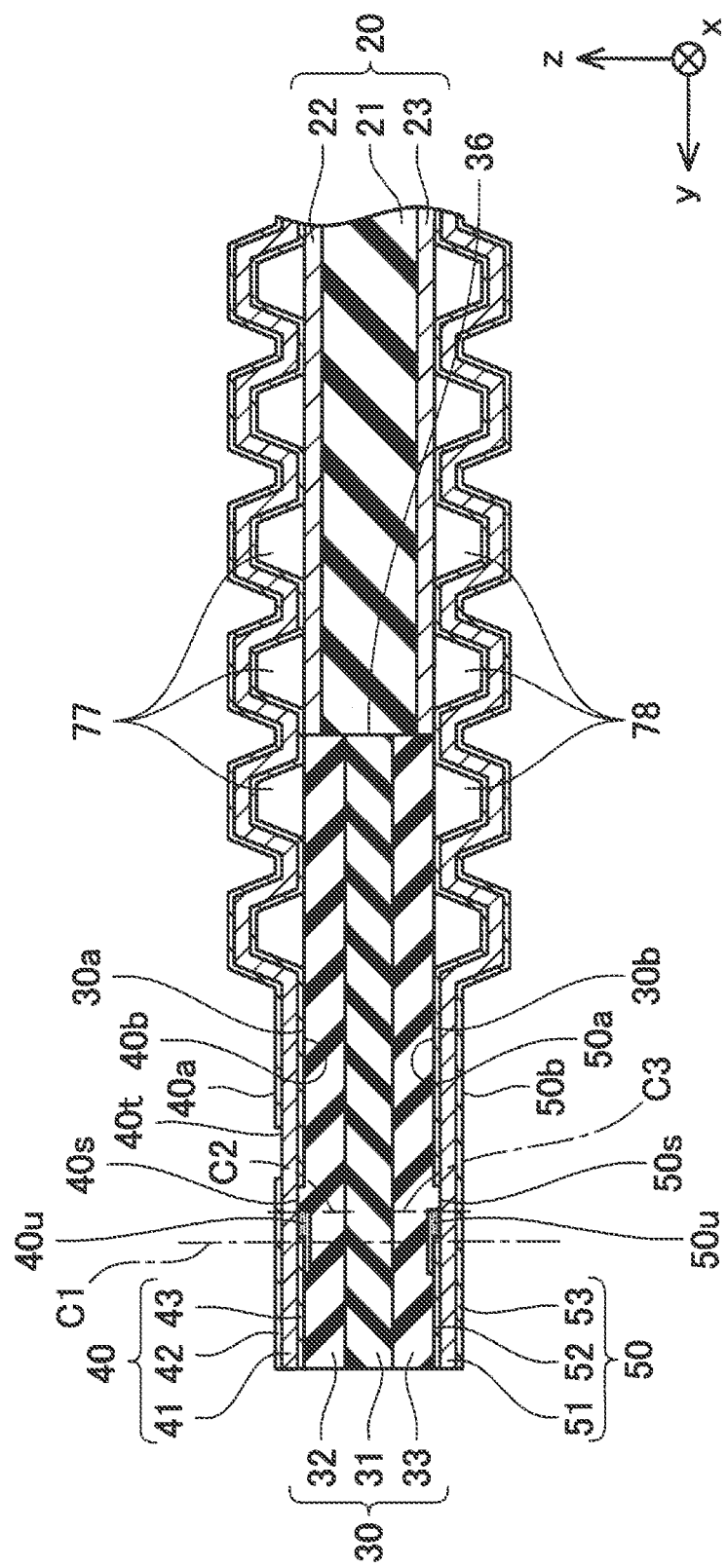
FIG. 14 is an explanatory view of the resin frame bonding step in Embodiment 2.

FIG. 13 illustrates a separator bonding step in Embodiment 2. As illustrated in FIG. 13, in Embodiment 2, respective central axes C2, C3 of the ranges 40s, 50s deviate from a central axis C1 of the pressurization range where the laminated body is sandwiched between the metal dies 90, 92 to a direction closer to the gas passages 77, 78. The pressurization range where the laminated body is sandwiched between the metal dies 90, 92 partially overlaps with the ranges 40s, 50s where the carbon films 43, 52 are removed. With the method, as illustrated in FIG. 14, a configuration where the ranges 40s, 50s are offset to the direction closer to the gas passages 77, 78 from the bonding ranges 40u, 50u is achieved. That is, a configuration where the central axes C2, C3 of the ranges 40s, 50s are offset to the direction closer to the gas passages 77, 78 from the central axis C1 of the bonding ranges 40u, 50u is achieved.

Figure 15:
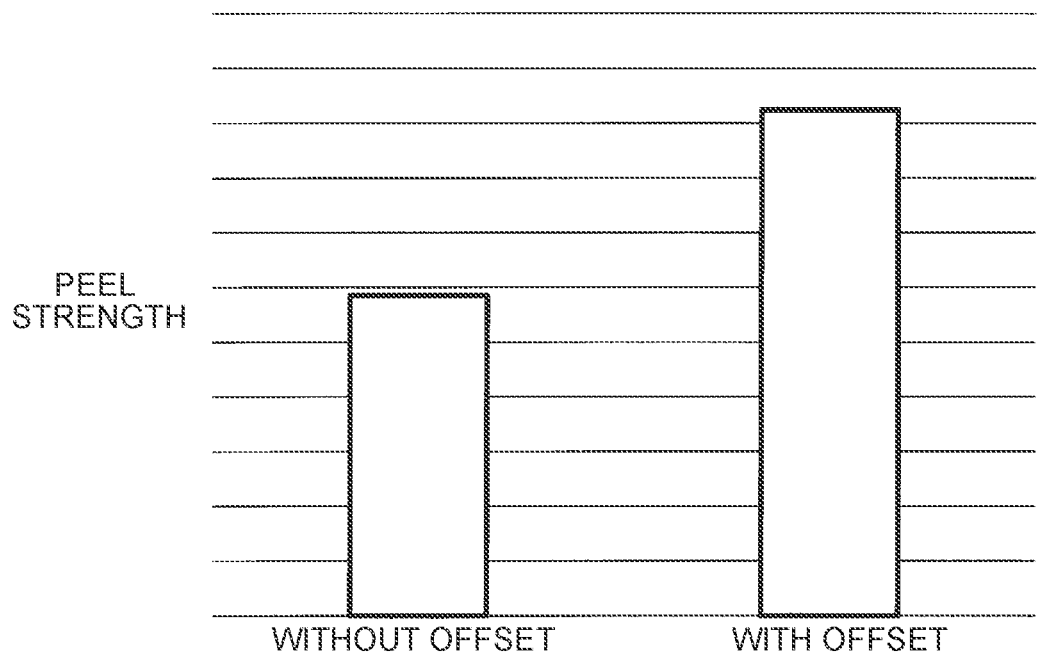
FIG. 15 is a graph illustrating a difference in peel strength based on whether an offset is provided or not.
Figure 16:
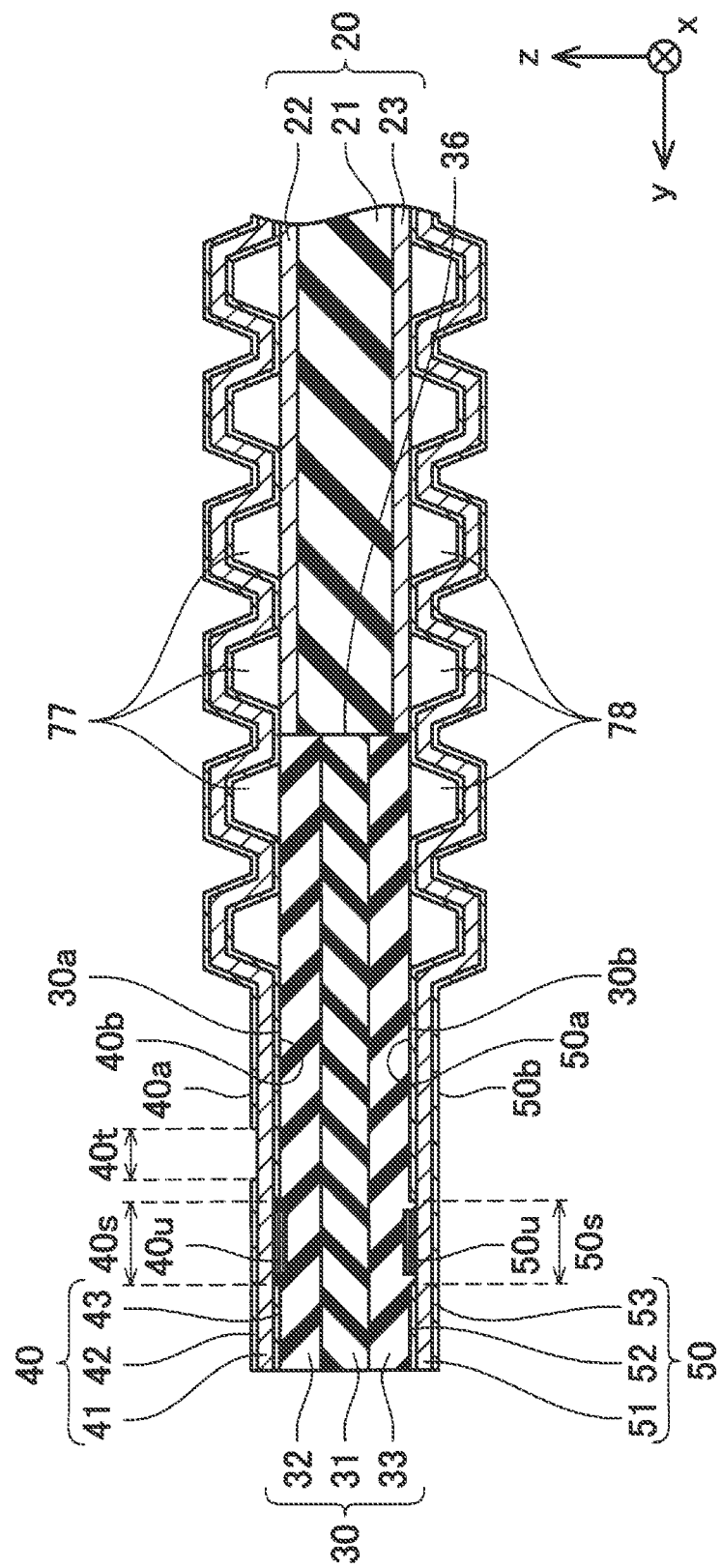
FIG. 16 is a sectional view when the widths of the ranges 40s, 50s are enlarged.

Even by the manufacturing method of Embodiment 2, the resin frame 30 is bonded to the separators 40, 50 within the ranges 40s, 50s where the carbon films 43, 52 are removed, thereby making it possible to achieve high adhesive strength. Further, when the ranges 40s, 50s are offset to the direction closer to the gas passages 77, 78 from the bonding ranges 40u, 50u as such, it is possible to achieve high adhesive strength as compared with a case where the ranges 40s, 50s are not offset (the case of FIG. 11). FIG. 15 illustrates results of measurement of the peel strength of the bonding range 40u at the time when the pressure in the fuel gas passage 77 is increased, in terms of a case where the range 40s is offset from the bonding range 40u toward the fuel gas passage 77 side (with offset) and a case where the range 40s is not offset (without offset). As illustrated in FIG. 15, higher peel strength is achieved in the case where the range 40s is offset than in the case where the range 40s is not offset. When the ranges where the carbon films are removed are offset to the side closer to the gas passages from the bonding ranges as such, higher adhesive strength is achieved. Note that, by increasing the widths of the ranges 40s, 50s as illustrated in FIG. 16, it is also possible to achieve as high adhesive strength as the adhesive strength obtained in the case where the ranges 40s, 50s are offset. However, in the case where the widths of the ranges 40s, 50s are increased, it is necessary to apply the laser beam to a wide range, so that it takes long time for the laser application step. On the other hand, in the configuration with offset as illustrated in FIG. 14, even though the widths of the ranges 40s, 50s (that is, the width of the application range of the laser beam) are narrow, the adhesive strength equivalent to that in the configuration of FIG. 16 is achieved. Accordingly, it is possible to execute the laser application step in a short time, so that a fuel cell can be manufactured more efficiently. Thus, with the manufacturing method of Embodiment 2, a fuel cell having high adhesive strength can be manufactured in a short time.

In a manufacturing method according to Embodiment 3, a laser fluence in the laser application step is controlled to 100 mJ/mm² or less. Further, in the separator bonding step, an adhesive hardener or an adhesive promoter is applied to the surface of the metal plate.

Figure 17:
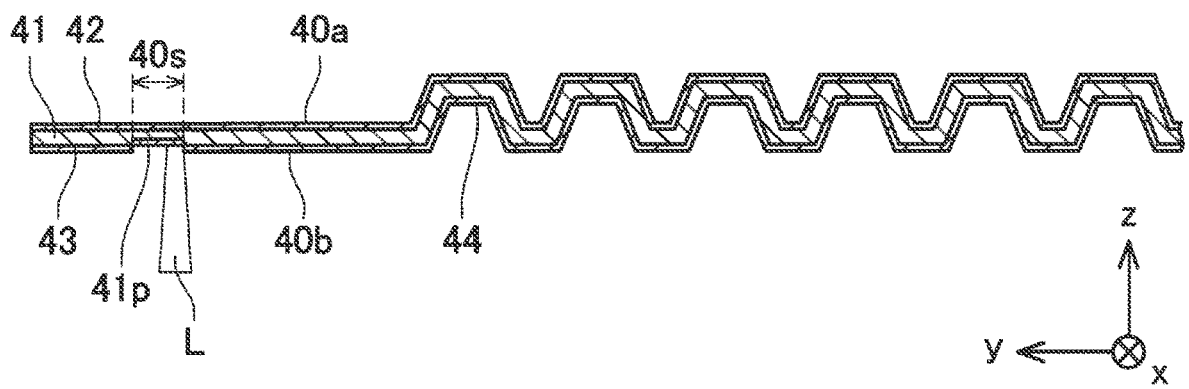
FIG. 17 is an explanatory view of a laser application step in Embodiment 3.

In the laser application step in Embodiment 3, the laser fluence is controlled to 100 mJ/mm² or less. When the laser fluence is controlled as such, a porous structure 41p made of TiOx (titanium oxide) is formed on the surface of the metal plate 41 within the range 40s to which the laser beam is applied, as illustrated in FIG. 17. Similarly, porous structures are also formed on the surface of the metal plate within the ranges 50s, 40t. Herein, porous structures with a thickness of around 10 nm to 1000 nm are formed.

In the separator bonding step in Embodiment 3, the adhesive hardener or the adhesive promoter is applied to the surfaces of the metal plates 41, 51 within the ranges 40s, 50s. Then, the adhesive hardener or the adhesive promoter permeates the porous structures. After that, similarly to Embodiment 1 or 2, a part including the ranges 40s, 50s is heated while the part is pressurized by the metal dies 90, 92. Since the viscosities of the adhesive hardener and the adhesive promoter are low, the adhesive hardener or the adhesive promoter easily moves outside the ranges 40s, 50s by being pushed by the pressure by the metal dies 90, 92. However, when the porous structures are formed within the ranges 40s, 50s like Embodiment 3, the adhesive hardener or the adhesive promoter permeates the porous structures, so that the adhesive hardener or the adhesive promoter easily remains within the ranges 40*s*, 50*s*. Hereby, bonding can be performed with higher adhesive strength within the ranges 40*s*, 50*s*.

In the gasket bonding step in Embodiment 3, the adhesive hardener or the adhesive promoter is applied to the surface of the metal plate 41 within the range 40*t*. Then, the adhesive hardener or the adhesive promoter permeates the porous structure. After that, the gasket 46 is bonded within the range 40*t*, similarly to Embodiment 1 or 2. With this method, since the adhesive hardener or the adhesive promoter easily remains within the range 40*t*, bonding can be performed with higher adhesive strength within the range 40*t*.

Note that, in Embodiments 1, 2, the adhesive hardener or the adhesive promoter may be applied within the ranges 40*s*, 50*s*, 40*t*.

The embodiments have been described above in detail, but the embodiments are only examples and do not limit the scope of Claims. The technology described in the scope of Claims includes the foregoing examples with various modifications and changes. Each of and various combinations of the technical elements described in the present specification or the drawings achieve technical utility, and the technical elements are not limited to the combination stated in the claims at the time of filing. Further, the technologies described in the present specification or the drawings can achieve a plurality of objects at the same time and have technical usefulness by achieving one of those objects.

What is claimed is:

1. A manufacturing method for manufacturing a fuel cell, the manufacturing method comprising:
   a laser application step of applying a laser beam to a carbon film of a separator including a metal plate and the carbon film covering a surface of the metal plate such that the metal plate is exposed by removing the carbon film within an application range of the laser beam; and
   a bonding step of bonding the separator to a resin member within a range including at least part of a range where the metal plate is exposed wherein:
   the resin member is a resin frame having a through-hole;
   the manufacturing method further includes a step of placing a membrane electrode assembly in the through-hole; and
   in the bonding step, the separator is bonded to the resin frame such that the through-hole is closed by the separator; and
   wherein:
   when the separator is bonded to the resin frame, a gas passage is formed on an interface between the separator and the resin frame; and
   the laser application step and the bonding step are executed to satisfy the following conditions:
   a condition in which the application range of the laser beam is placed to be distanced from the gas passage and to extend along the gas passage;
   a condition in which a bonding range in which the separator is bonded to the resin frame is placed to be distanced from the gas passage and to extend along the gas passage; and
   a condition in which a central axis of the application range is placed at a position closer to the gas passage than a central axis of the bonding range.

2. The manufacturing method according to claim 1, wherein:
   the resin member is a gasket;
   the separator includes a first surface covered with the carbon film and a second surface placed on a side opposite to the first surface;
   in the laser application step, the laser beam is applied to the first surface;
   in the bonding step, the first surface is bonded to the gasket; and
   the manufacturing method further includes
      a step of placing a membrane electrode assembly in a through-hole of a resin frame having the through-hole, and
      a step of bonding the second surface to the resin frame such that the through-hole is closed by the separator.

3. The manufacturing method according to claim 1, wherein:
   a laser fluence in the laser application step is 100 mJ/mm$^2$ or less; and
   in the bonding step, the separator is bonded to the resin member after an adhesive hardener or an adhesive promoter is applied to the surface of the metal plate within the application range.

4. The manufacturing method according to claim 3, wherein, in the laser application step, a porous structure is formed on the surface of the metal plate within the application range.

5. A manufacturing method for manufacturing a fuel cell, the manufacturing method comprising:
   a laser application step of applying a laser beam to a carbon film of a separator including a metal plate and the carbon film covering a surface of the metal plate such that the metal plate is exposed by removing the carbon film within an application range of the laser beam; and
   a bonding step of bonding the separator to a resin member within a range including at least part of a range where the metal plate is exposed wherein:
   the resin member is a resin frame having a through-hole;
   the manufacturing method further includes a step of placing a membrane electrode assembly in the through-hole; and
   in the bonding step, the separator is bonded to the resin frame such that the through-hole is closed by the separator; and
   wherein:
   when the separator is bonded to the resin frame, a gas passage is formed on an interface between the separator and the resin frame;
   in the bonding step, the separator is bonded to the resin frame within a pressurization range by heating the pressurization range while the separator is pressurized to the resin frame by a metal die; and
   the laser application step and the bonding step are executed to satisfy the following conditions:
   a condition in which the application range of the laser beam is placed to be distanced from the gas passage and to extend along the gas passage;
   a condition in which the pressurization range is placed to be distanced from the gas passage and to extend along the gas passage; and
   a condition in which a central axis of the application range is placed at a position closer to the gas passage than a central axis of the pressurization range.

\* \* \* \* \*